(12) United States Patent
Palanisamy

(10) Patent No.: US 12,388,761 B2
(45) Date of Patent: Aug. 12, 2025

(54) SYSTEM AND METHOD FOR TIME SLICED BASED TRAFFIC DETECTION

(71) Applicant: Sandvine Corporation, Waterloo (CA)

(72) Inventor: Anuram Palanisamy, Coimbatore (IN)

( * ) Notice: Subject to any disclaimer, the term of this patent is extended or adjusted under 35 U.S.C. 154(b) by 0 days.

(21) Appl. No.: 18/081,186

(22) Filed: Dec. 14, 2022

(65) Prior Publication Data

US 2023/0198911 A1    Jun. 22, 2023

(30) Foreign Application Priority Data

Dec. 17, 2021  (IN) .............................. 202111058859

(51) Int. Cl.
*H04L 47/2441* (2022.01)
*H04L 43/04* (2022.01)
*H04L 43/062* (2022.01)

(52) U.S. Cl.
CPC .......... *H04L 47/2441* (2013.01); *H04L 43/04* (2013.01); *H04L 43/062* (2013.01)

(58) Field of Classification Search
CPC ... H04L 47/2441; H04L 43/04; H04L 43/062; H04L 41/142; H04L 43/026; H04L 43/028; H04L 41/16
See application file for complete search history.

(56) References Cited

U.S. PATENT DOCUMENTS

| | | | | |
|---|---|---|---|---|
| 7,082,132 | B1 * | 7/2006 | Beshai ................. | H04Q 3/5455 370/386 |
| 2019/0020663 | A1 | 1/2019 | Bartos et al. | |
| 2020/0379810 | A1 * | 12/2020 | Dalmia ................. | G06F 9/5016 |

FOREIGN PATENT DOCUMENTS

| | | | | |
|---|---|---|---|---|
| EP | 2908485 | A1 * | 8/2015 | ......... H04L 47/2441 |
| EP | 3700147 | A1 * | 8/2020 | ............. G06N 20/00 |
| EP | 3739813 | A1 | 11/2020 | |

OTHER PUBLICATIONS

Extended European Search Report, European Patent Office, corresponding Europe Application No. 22213272.2, dated May 8, 2023.
Liu Yang et al: "A novel algorithm for encrypted traffic classification based on sliding window of flaw's first N packets", 2017 2nd IEEE International Conference on Computational Intelligence and Applications (ICCIA), IEEE, Sep. 8, 2017 (Sep. 8, 2017), pp. 463-470, XP033276545, DOI: 10.1109/CIAPP.2017.8167261.
94(3) Office Action, European Patent Office, corresponding Europe Application No. 22213272.2, dated Feb. 29, 2024.

* cited by examiner

*Primary Examiner* — Anh Nguyen
(74) *Attorney, Agent, or Firm* — Amarok IP Inc.; Neil W. Henderson

(57) ABSTRACT

A method for classifying a traffic flow including; determining a plurality of time slices to be used to classify the traffic flow; collecting traffic flow data for a first time slice of the plurality of time slices; if the flow is classifiable based on the first time slice, classifying the traffic flow; otherwise collecting the traffic flow data for each further time slice of the plurality of time slices to classify the traffic flow. A system for classifying a traffic flow having: a time interval module configured to determine a plurality of time slices to be used to classify the traffic flow; a data collection module configured to collect traffic flow data for each of the plurality of time slices; a classification module configured to determine whether the flow is classifiable based after each time slice, and classify the traffic flow.

16 Claims, 7 Drawing Sheets

SYSTEM AND METHOD FOR TIME SLICED BASED TRAFFIC DETECTION

RELATED APPLICATION

This application claims priority on Indian Patent Application No. 202111058859 filed Dec. 17, 2021, and on European Patent Application No. 22213272.2 filed Dec. 13, 2022, which are hereby incorporated herein in their entirety.

FIELD

The present disclosure relates generally to handling of computer network traffic. More particularly, the present disclosure relates to a system and method for time sliced based traffic detection and classification.

BACKGROUND

Internet and online computer network traffic continues to increase. Much of this computer network traffic is now being encrypted. With encryption being enforced in all kinds of traffic, identifying an application contained in encrypted traffic is often a challenge. Identifying as much traffic as possible, and ideally 100% of the traffic, to a category or traffic or an application is key for taking any action or decision on the network traffic. Traffic identification (either to an application or to a traffic category) generally happens using various techniques. First, classification is generally based on byte pattern and strings available in the payload. Second, is using that flow (identified by, for example, source, destination address (IP & port) & transport protocol) correlating to another expected flow with a pattern.

The second method may be used to detect encrypted flows. In a typical network, identifying, for example, a top 25 applications would cover 90% of the network bandwidth. It may be difficult or impossible to cover the remaining 10%, even with thousands of protocols.

As such, there is a need for an improved system and method for classifying network traffic, based on other techniques to determine the traffic flow of a network.

The above information is presented only to assist with an understanding of the present disclosure. No determination has been made, and no assertion is made, as to whether any of the above might be applicable as prior art with regard to the present disclosure.

SUMMARY

In a first aspect, there is provided a method for classifying a traffic flow in a computer network, the method including: determining a plurality of time slices to be used to classify the traffic flow; collecting traffic flow data for a first time slice of the plurality of time slices; if the flow is classifiable based on the first time slice, classifying the traffic flow; otherwise collecting the traffic flow data for each further time slice of the plurality of time slices to classify the traffic flow; and performing traffic action on the classified flow.

In some cases, the method may further include: building a classification model to classify the traffic flow for each of the plurality of time slices.

In some cases, each classification model may be based on traffic flow data and the classification results of at least one previous time slice.

In some cases, the method may further include: determining whether the traffic flow has reached a maximum flow age; and if the maximum flow age has been reached, determining the flow is unclassified.

In some cases, the method may further include: determining a plurality of possible classifications for the traffic flow; and providing confidence levels for each of the possible classifications.

In some cases, each time slice may be between 1 and 5 seconds. In some other cases, each time slice may be between 1 and 3 seconds.

In some cases, the data collected for each further time slice may include cumulative statistics for the traffic flow.

In some cases, the method may further include: determining the accuracy of each of the classification models for each time slice; determining whether the accuracy is at an acceptable threshold level; and if the accuracy is below an acceptable threshold level, updating the classification model.

In another aspect there is provided a system for classifying a traffic flow in a computer network having: a time interval module configured to determine a plurality of time slices to be used to classify the traffic flow; a data collection module configured to collect traffic flow data for each of the plurality of time slices; a classification module configured to determine whether the flow is classifiable based after each time slice, and classify the traffic flow; and a packet processing engine configured to perform traffic action on the classified flow.

In some cases, the system may include a model making module configured to build a classification model to classify the traffic flow for each of the plurality of time slices.

In some cases, the model making module may be configured to build each classification model based on traffic flow data and the classification results of at least one previous time slice.

In some cases, classification module may be further configured to: determine whether the traffic flow has reached a maximum flow age; if the maximum flow age has been reached, determine the flow is unclassified.

In some cases, the classification module may be configured to: determine a plurality of possible classifications for the traffic flow; and provide confidence levels for each of the possible classifications.

In some cases, the time interval module may configure each time slice to between 1 and 5 seconds. In other cases, the time interval module may configure each time slice to between 1 and 3 seconds.

In some cases, the data collection module may be configured to provide data collected for each further time slice comprises cumulative statistics for the traffic flow.

In some cases, the model making module may be further configured to: determine the accuracy of each of the classification models for each time slice; determine whether the accuracy is at an acceptable threshold level; and if the accuracy is below an acceptable threshold level, update the classification model.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Figure 1:
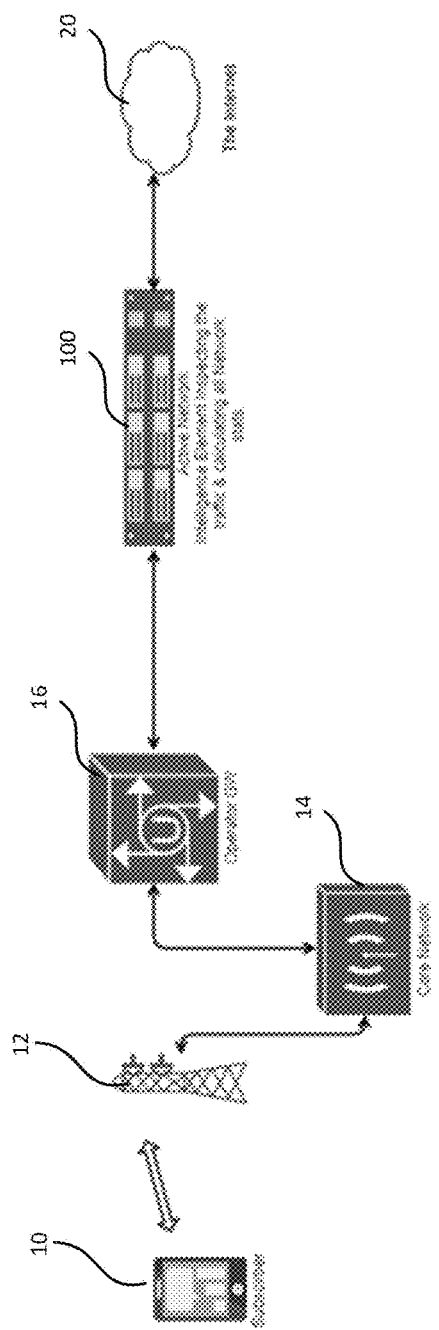
FIG. 1 illustrates an environment for computer network traffic over an operator network.

Generally, the present disclosure provides a method and system for traffic detection and classification using time slices. The system is configured to determine a plurality of time slices in which to detect and classify traffic flows. It is intended that the time slices time to classify sufficiently short in that the network may apply traffic management actions to the traffic once it is classified. During an initial time slice, data and traffic statistics are collected. The collected data is reviewed and passed on by the system in order to classify the traffic flow, via, for example, machine learning, heuristics or other more conventional methods. If the flow is not yet able to be fully classified, it may be partially classified or not at all classified. If partially or not classified, the system will collect statistics for the next time interval and the new statistics as well as any previous model output will be combined to attempt to classify the traffic flow at each next iteration or each next time slice.

Generally, deep packet inspection of (DPI) has been used to review and classify network traffic. DPI may generate various information associated with a network traffic flow related and provide statistics associated with the network characteristics of the flow. In some cases, DPI may provide information with respect to how bursty the flows are, what is the time difference between packets, count of packets of different size, and other network parameters that exhibit the characteristics of the flow. These statistics and attributes may be used by the embodiments of the system and method detailed herein to build a machine learning model. The machine learning model as detailed herein, may then determine whether other encrypted flows exhibit characteristics of a streaming video traffic flow, a Voice over Internet Protocol (VoIP) traffic flow, a Web surfing traffic flow, or another type of traffic flow. Further, the machine learning model may also determine characteristics such as application, device or device type, or other classification attributes. It is intended that embodiments of the system and method, with the aid of the machine learning model will be used to identify and classify the traffic flow. Once the traffic flow is categorized or classified, the traffic flow, various policies or traffic actions may be applied to the traffic flow based on the classification.

As detailed herein, at a given age of the network traffic flow, various statistics and/or attributes may be measured and passed to build a classification model. It is intended that the flow may be reviewed one or a plurality of times in order to provide an appropriate classification as detailed herein. The classification model is configured to identify various categories of network traffic. The classification model may be used in production environments of a network operator to identify the traffic application category when the network statistics/attributes are past at a predetermined age of the flow as detailed herein.

FIG. 1 illustrates an environment for an embodiment of the system. A subscriber, using a user device 10, may initiate a traffic flow with a base station 12. The traffic flow may be transmitted to and from a core network 14 from the base station. The traffic flow may be seen and directed by the operator network 16 and may be reviewed and classified by the system 100. The system may include or be a component of a network device which reside between the operator's gateway and the Internet 20. The system 100 is intended to reside within the operator's or Internet Service Provider's (ISP's) network 15 and use a pre-trained supervised machine learning model to analyze the traffic flows at various time slices and determine or predict what application is being transmitted over the network. It will be understood that embodiments of the system and method detailed herein are intended to be employed over any type of computer network, for example, fixed line, mobile, satellite or other network.

In the embodiments of the system and method detailed herein, a model may be built based on the pre-labeled data to classify the traffic to a plurality of popular category of traffic flows, In some cases, these categories may be selected by the operator. In other cases, there may be a predefined set of categories. The model is deployed in the network, and is accessible by the system, which collects various network attributes & statistics of a traffic flow and pass the attributes and statistics to the model. The model reviews the statistics and attributes to provide a classification or category for the network traffic flow.

In some conventional solutions, a model previously takes a fixed time frame, once per flow, to collect the network traffic statistics and attributes and then pass the collected information for model prediction. In some cases, a wait of, for example, 15 seconds to do a single prediction is intended to produce the maximum accuracy when all flows are predicted at the same time. With a 15 second collection time, flows, which are less than 15 seconds in age fail to be classified. It will be understood that many web-browsing flows are shorter than this threshold and may not be classified by conventional solutions. Further, there may be no traffic actions completed on these short flows, even if there are policies directed at that type of traffic as the traffic was missed being classified.

When all the traffic flows wait for 15 second to call for a prediction, a few traffic categories would lose or become diluted. In particular, flows that are characteristically over 15 seconds may appear to be a higher percentage and these results will impact accuracy of the flow classification.

With less accuracy, classification of the flow may be incorrect or returned to unclassified. Moreover, conventional solutions calculating statistics for 15 seconds has been shown to have a CPU and memory cost, which, if the flow ends before 15 seconds, the CPU and memory cost have no benefit.

Conventional solutions, which required more time to classify traffic were better suited for analytics than control actions. Any control action intended to block or reset on a newly classified flow will cause the application to stop using the flow and start a new flow. In these scenarios, it would require a further 15 seconds to identify and the action applied is unlikely to impact the application. As such, it was determined a system and method for classifying traffic at early or more frequent intervals would be beneficial to operators implementing control or traffic actions on classified flows.

Figure 2:
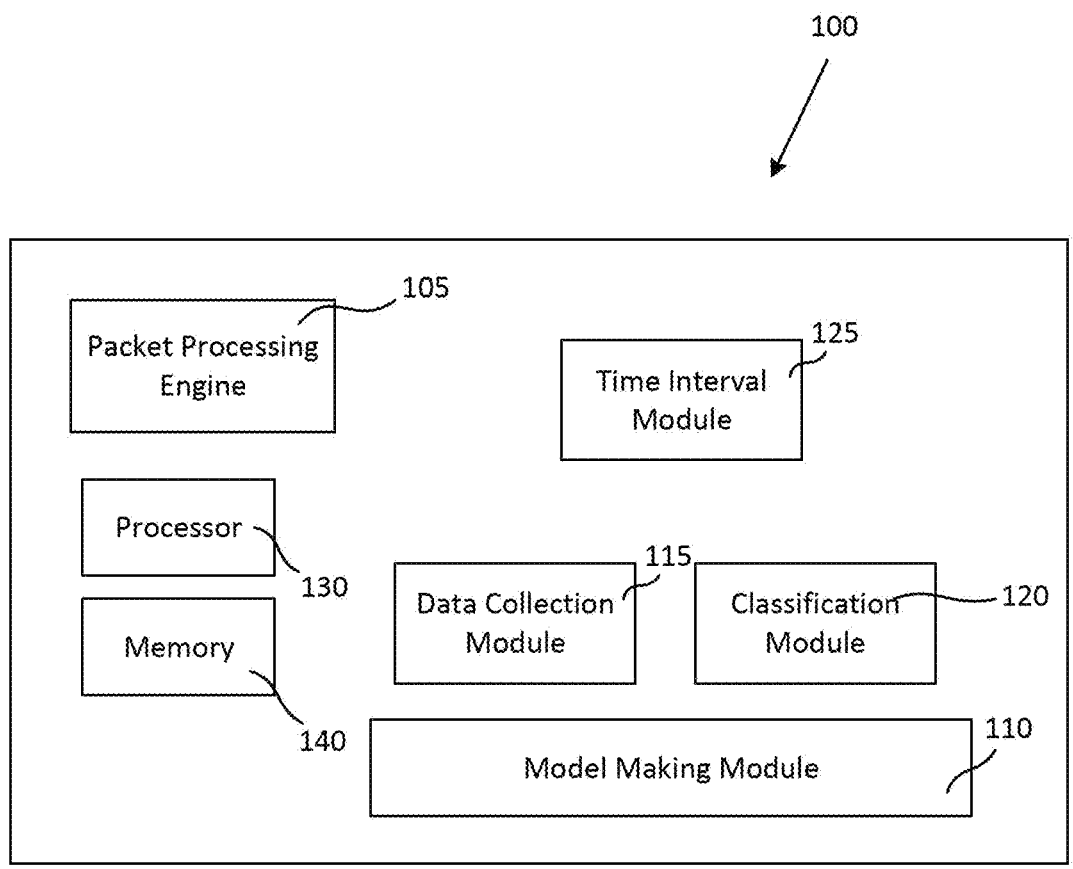
FIG. 2 illustrates an embodiment of a system for time sliced based traffic detection.

FIG. 2 illustrates a system to time sliced traffic detection and classification according to an embodiment. The system includes a packet processing engine 105, a model making module 110, a data collection module 115, a classification module 120, a time interval module 125, at least one processor 130 and at least one memory component 140. The system is generally intended to be distributed and reside in at least one network device on the data plane. The processor may be configured to execute the instructions stored in the memory component in order for the modules to execute their functions. The system 100 is intended to receive information from the computer network equipment that allows the system to determine traffic flow statistics and provide for traffic action instructions and traffic management rules for the network.

The packet processing engine 105 is configured to be used to determine when a new flow has been initiated. The packet processing engine 105 may also determine whether any traffic actions are to be associated with the traffic flow and packets of the traffic flow once the traffic flow is classified.

The model making module 110 is configured to make and store machine learning models to classify the traffic. The model making module 110 may include a memory component to store the models or may use the memory component of the system to store the models. In some cases, the model making module 110 may update or determine the accuracy of any machine learning module and update models that are found to be inaccurate as further detailed herein.

The data collection module 115 is configured to collected statistics associated with the traffic flow. In some cases, the data collection module 115 may collected statistics such as: minimum, maximum, mean and standard deviation on network data like bytes received/sent, bitrate, burst rate, burst duration, active time, idle time, idle bitrate and other network parameters.

The classification module 120 is configured to classify the traffic flow using a model from the model making module based on the time interval currently associated with the traffic flow. The classification model 120 is configured to classify the traffic based on the type of traffic, for example, video streaming, data transfer, VoIP, or the like as well as the application associated with the traffic flow, for example, Netflix, WhatsApp or the like. The classification model 120 may classify the type of traffic based on the application associated with the traffic flow.

The time interval module 125 is configured to determine a time period for each time slice for the data collection and model review of the traffic flow. In some cases, the time interval module may be configured to update the time intervals if it has been shown that more or less flows are being classified at a particular time interval. It is intended that the intervals may be in the order of seconds, for example 1 second, 2 seconds, 3 seconds 5, seconds or the like. In some cases, the time interval may be less than one second. The time intervals may depend on the use case and the observations made by the model.

Figure 3:
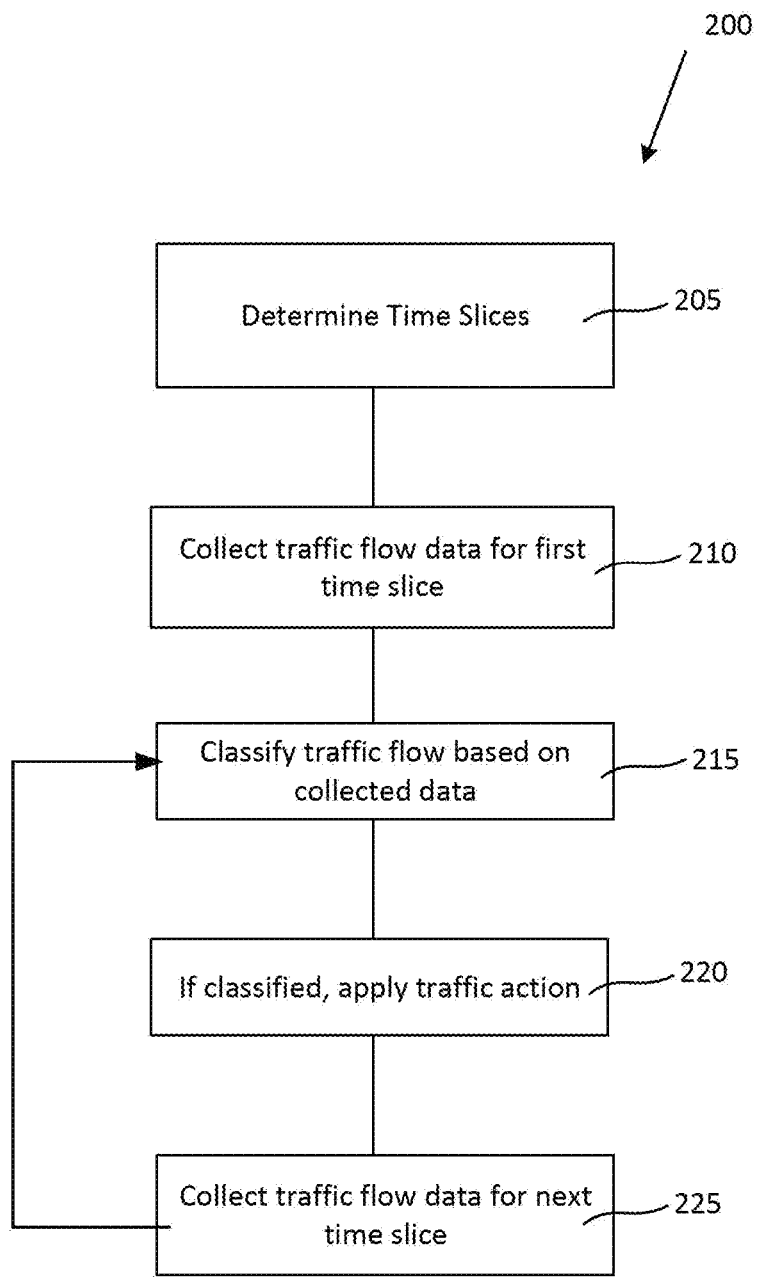
FIG. 3 illustrates an embodiment of a method for time sliced based traffic detection.

FIG. 3 illustrates a high-level flow chart of a method 200 for time spliced traffic detection. At 205, the system may determine appropriate time slices to be used in the traffic detection and classification. The time slices may be preconfigured by the system or a network operator and may be amended from time to time. At 210, the data collection module collects traffic flow data received or determined by the packet processor engine 105 via, for example, deep packet inspection or application recognition.

At 215, the classification model attempts to classify the traffic flow based on the collected data. If the traffic flow is not able to be classified, the traffic flow may be partially classified depending on the traffic flow statistics and behavior. If the traffic flow is classified, traffic actions, for example, prioritization, policies and/or rules may be applied to the traffic flow. Otherwise, the data collection module will continue to gather data associated with the traffic flow until the next time slice interval, at 225. Once the next time slice is collected, the system will try to classify the traffic flow based on the newly collected data, the initial data and the initial classification, if any.

Figure 4:
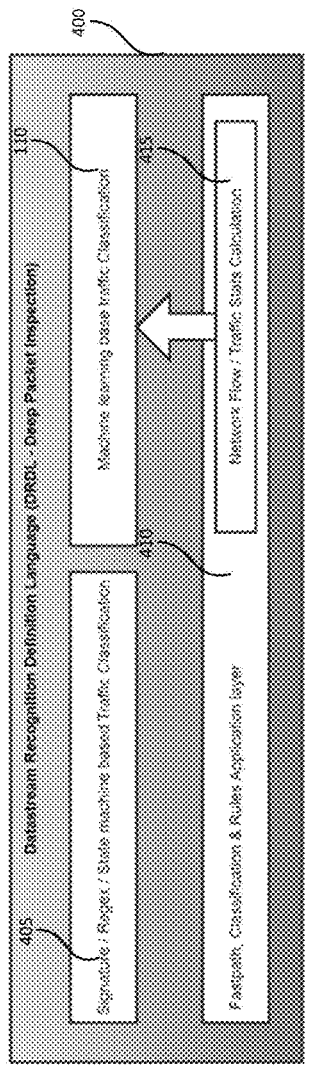
FIG. 4 illustrates a data stream recognition definition language.

FIG. 4 is a table showing the components of DataStream Recognition Definition Language (DRDL) 400. A Signature/Regex/State machine 405 may provide for traffic classification. The traffic classification may be a conventional method, based on a plain text information available in the payload and/or a particular byte pattern available in the payload. In some cases, there may be a single form or a plurality of forms that can be aggregated or otherwise amalgamated for classification.

The DRDL may also include a FastPath module 410 where raw packet passing through the network is reviewed and travels through the network. The FastPath module 410 may include a Network Flow/Traffic Stats Calculation module 415. This module may look at each network packet flowing through, the flow characteristics like, burst, bitrate, active time, idle time and various other characteristics are determined and sent to the model making module 110. Machine Learning based traffic classification is intended to be provided by the Machine learning model using the network traffic stats and predict the flow.

Figure 5:
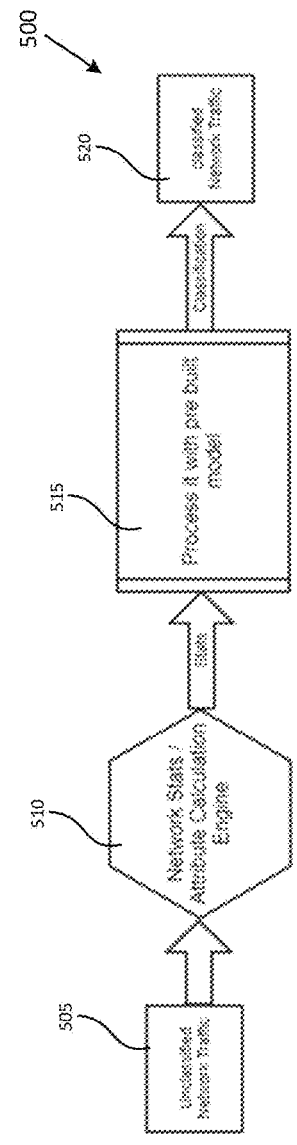
FIG. 5 illustrates a method for processing network traffic via a classification model.

FIG. 5 illustrates a conventional method 500 of classifying a traffic flow in a conventional machine learning based classification system. A flow of unclassified network traffic is initiated at 505. When the traffic flow is started, the traffic flow is understood as an unclassified flow and there may be a plurality of options or techniques, for example, machine learning, state machines or the like, to classify the flow. At 510, a network statistic calculation module may begin by measuring every packet and counting various statistics associated with the traffic flow. These statics may be fed, at 515, to a Machine learning model as input data. The statistics are generally collected and accumulated from the beginning of the flow for a predefined time of the flow, which is conventionally in the range of 15 seconds.

Collected data and statistics about the network flow will be used in the machine learning model for prediction. Single or a plurality of machine learning model types may be used predict the flow to a traffic classification category (for example, VoIP, Streaming, Peer-2-Peer, Data Transfer or the like) or to an application like Netflix, YouTube, Facebook or the like, at 520. Generally, any flow that does not receive above a predefined accuracy threshold on the Machine learning models will be considered as unclassified traffic.

It has been noted that various online application and online traffic exhibit different behavior based on the type of traffic and/or the age of the flow. For example, both streaming and data transfer category of application will have sudden spike of traffic at the beginning of the flow. After a while the data transfer traffic flow stabilizes with the maximum capacity of either the client or the server bandwidth. This is unlike a traffic flow for video streaming which tends to stay at the peak for a short time of the traffic flow.

Figure 6:
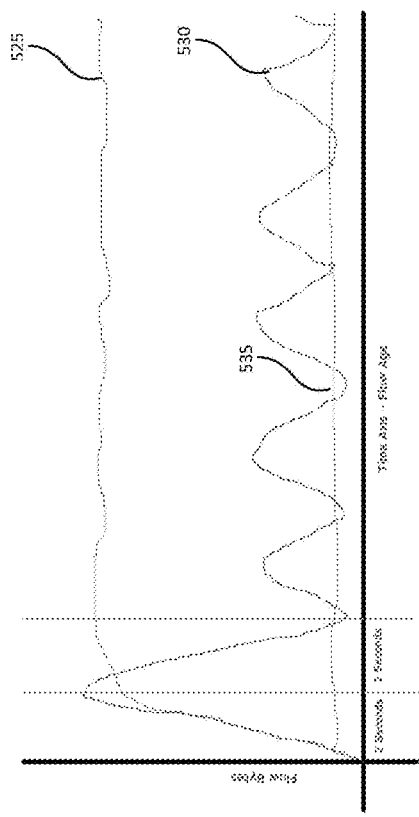
FIG. 6 is a graph illustrating traffic flow byte transfer over time of the flow.

FIG. 6 is an example chart of various traffic flows. A data transfer traffic pattern is shown as 525 and may include applications such as: Android Apps store, file download, and the like. A traffic pattern for a video streaming traffic flow is shown as 530, which may include Netflix video, YouTube, or other progressive streaming application. A traffic flow pattern for a VoIP traffic flow is shown at 535 and may include applications such as WhatsApp Call, Skype or other types of VoIP Call.

In review of the traffic flow data patterns, it can be seen that Video Streaming & Data transfer flows perform similarly for an initial period, 2 seconds in this example. However, when compared with other types of flows, this patter appears to show that the flow would be either Video Streaming or Data Transfer traffic. As such, the traffic flow may be partially recognized. An embodiment of the present system and method may determine that the traffic flow is either streaming or data transfer but unlikely to be VoIP. The system may use the next time slice to further categorize the traffic flow as either streaming or data transfer.

A VoIP traffic flow may be distinguishable within a first time slice, for example the first 2 seconds of the flow. VoIP traffic flows tend to exhibit a strong behavior pattern that is different when compared to other traffic type. Similarly, a plurality of different traffic, types can be distinguishable when an inference is made given the flow age of the traffic flow. Further, embodiments of the method and system defined herein are intended to provide for higher accuracy of the prediction when compared to predicting all of the categories of traffic at a single flow age/time point of the flow rather than at various flow ages.

Embodiments of the system and method disclosed herein are configured to calculate statistics for the traffic flow at different time/age of the flow. The time slices used to detect and classify the traffic flow may vary from operator to operator and may be configurable. In some cases, the time slices may be every two seconds of the traffic flow until the traffic flow is classified. The system and method are intended to classify the traffic flow based on the application type or application and use machine learning to predict the application type or application at different ages of the flow. It is intended, that by using time as a slicing factor, bytes or other factory that segments the flow in the different parts to be used here. It can be used in combination of such slicing factor.

In addition, the results of the prediction from of one stage is intended to be passed to the next stage to increase the accuracy of the prediction. Embodiments of the present system and method are intended to improve the accuracy of classification, individual application, device, or any model that identifies network traffic.

Figure 7:
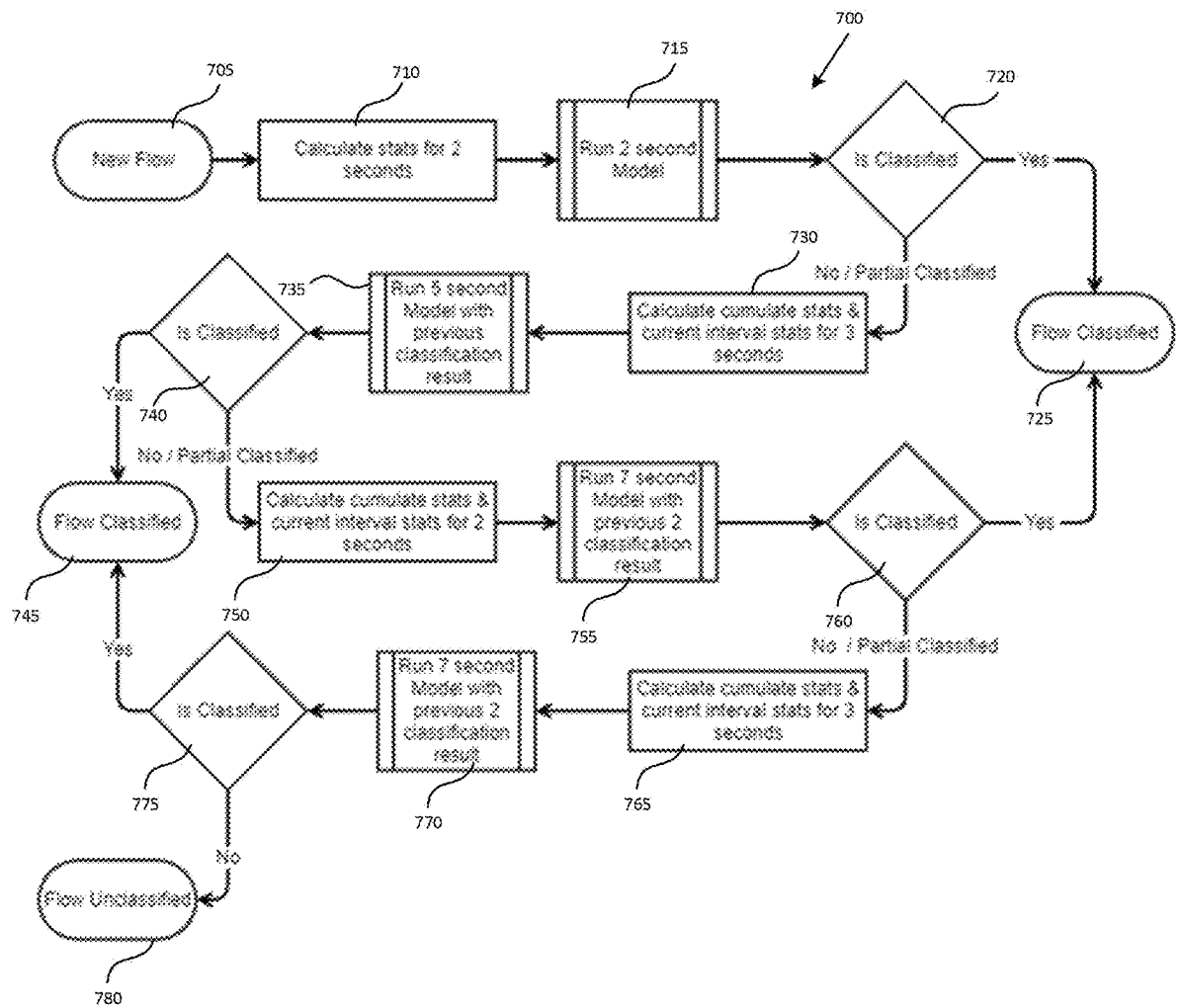
FIG. 7 illustrates a method for time sliced based traffic flow classification according to an embodiment.

FIG. 7 illustrates a flow chart of a method for time sliced traffic detection. At 705, a new flow is initiated. At 710, statistics associated with the flow, for example the number of bites transferred, the proportion of bandwidth or the like, is collected by the data collection module of the system. This data is collected for an initial time slice, for example, 2 seconds, 3 seconds, 5 seconds, or the like. It will be noted that the time slice may be preconfigured by the time interval module and may be configurable by the operator. At the end of the first time interval, the collected statistics may be reviewed by a classification module, at 715.

At 720, the system will determine whether the traffic flow is classified. If the flow is classified, at 725, the system will associate the classification with the traffic flow and allow the traffic flow to be associated with any traffic action for that classification, for example, a particular prioritization, a specific policy, or the like.

At 730, if the flow is not classified or only partially classified after a first time interval, the data collection module may continue to collect statistics about the data flow for a second predetermined time slice. The second predetermined time slice may be for the same amount of time or a different amount of time than the first time slice. At 735, the system may review the collected statistics associated with the traffic flow with any previously partial classification. At 740, the system may determine whether the traffic flow is now classified, at 745 or if the traffic flow remains not classified or partially classified.

If a flow is not classified or only partially classified, further data will be collected for a further time slice, at 750. The next interval may have the same length or a different length than the previous intervals. At 755, a machine learning classification model will review the statistics and previous results. At 760, the system will determine whether the model has classified the flow.

For any flow that remains not classified or only partially classified, at 765, further statistics may be collected over a further time slice, The time slice may be the same amount of time or may be a different period of time. The system will then provide the statistics and the previous classification results to the machine learning models of the system, at 770. The system will determine whether the model was ablet to classify the flow, at 775 or if the flow remains unclassified, at 780. In some cases, there may be a configured time or a configured number of attempts in which to classify the flow prior to the flow being determined as unclassified.

Figure 8:
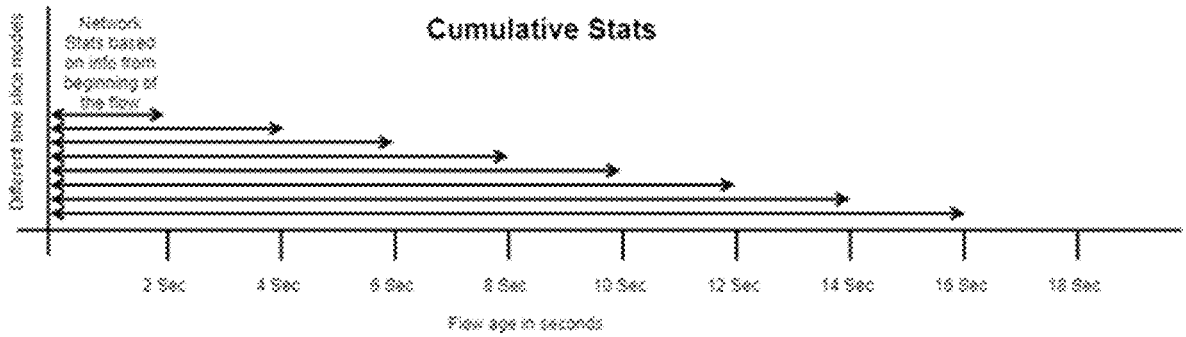
FIG. 8 is a graph showing cumulative statistics over a flow age in seconds.

There are various manners in which the data collection module may be able to collect and determine network statics. In a first example, in FIG. 8, the statistics may be cumulative statistics. Network statistics may be collected and measured based on information from beginning of the flow. The statistics such as bitrate, min/max/mean/standard deviation/any other calculation would happen based on information or calculated data from beginning of the flow. In some cases, the min/max/mean and standard deviation of the various network statistics collected by the data collection module may be determined.

Figure 9:
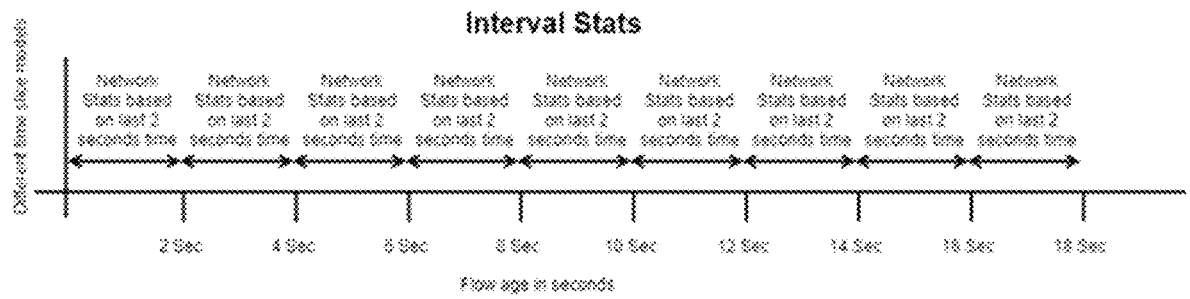
FIG. 9 is a graph showing interval statistics over a flow range in seconds.

In another example, as shown in FIG. 9, interval statistics may be collected. Network statistics may be collected and measured based on information from the previous evaluated interval (the last time slice) of the flow. The statistic like bitrate, min/max mean/standard deviation/any other calculation would happen based on information or calculated data for the previous interval of the flow.

Further, the system and models are configured to include previous model data in the classification. Every time the model is inferenced, if the classification is not successful the result of the model is feed in as a data for next inference. All data regarding classification outcome including various possible classifications and each classifications corresponding confidence can be fed into next inference as an input feature.

Figure 10:
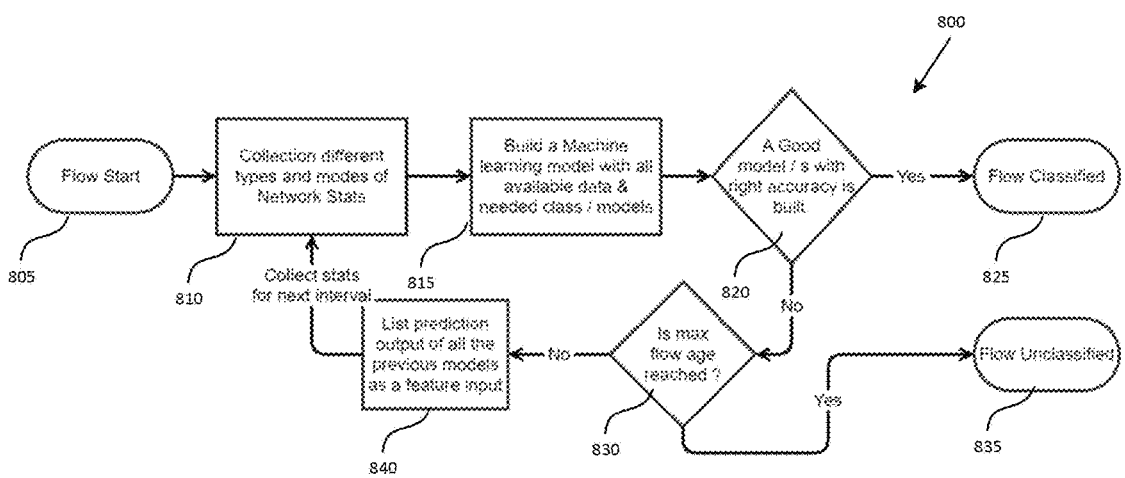
FIG. 10 illustrates a flow chart of method for classifying a flow according to an embodiment.

In some cases, a machine-learning model making module may be used to build the model. Input data to the model may be the above collected network statistics and attributes collected. FIG. 10 illustrates a method 800 for building a model to classify a traffic flow.

At 805, a flow is started. At 810, data is collected from the network flow as detailed above. At 815, a machine learning model is built from the data. The data may be analyzed by the model making module and may be cleaned. Further, the features of the network flow may be selected, and the data may be cleaned. At 820, the model may be used to classify a flow and it may be determined whether the model is affective and accurate. At 825, if the model is accurate the flow will be classified correction. At 830, the system is intended to check to see if a maximum flow age has been reached. The maximum flow age may be preconfigured by the system or may be updated from time to time by an operator or by the model based on the length of time it takes to classify flows. If the maximum flow age has been reached, the flow should be marked as unclassified. At 835, if not further iterations may be completed. At 830, if the accuracy of the model is not appropriate, further iterations may be completed.

In some cases, there may be a single or a plurality of machine learning models configured to classify traffic. In a specific example, the first time slice interval may have a plurality of models depending on the use case and the data outcome of the data collection and classification. In some cases, if there is a plurality of models, a first model may attempt to classify the data and if there is no classification or only a partial classification a second or further model may be used.

It is intended that the results or outcome of a first model will be used in subsequent models, either for the same time interval or the next time interval or time slice. It is intended that embodiments of the system and method repeat the classification of the flow until either the flow is classified, or a maximum flow age is reached. The maximum threshold flow age may vary by operator and may be preconfigured and/or updated by the operator.

Figure 11:
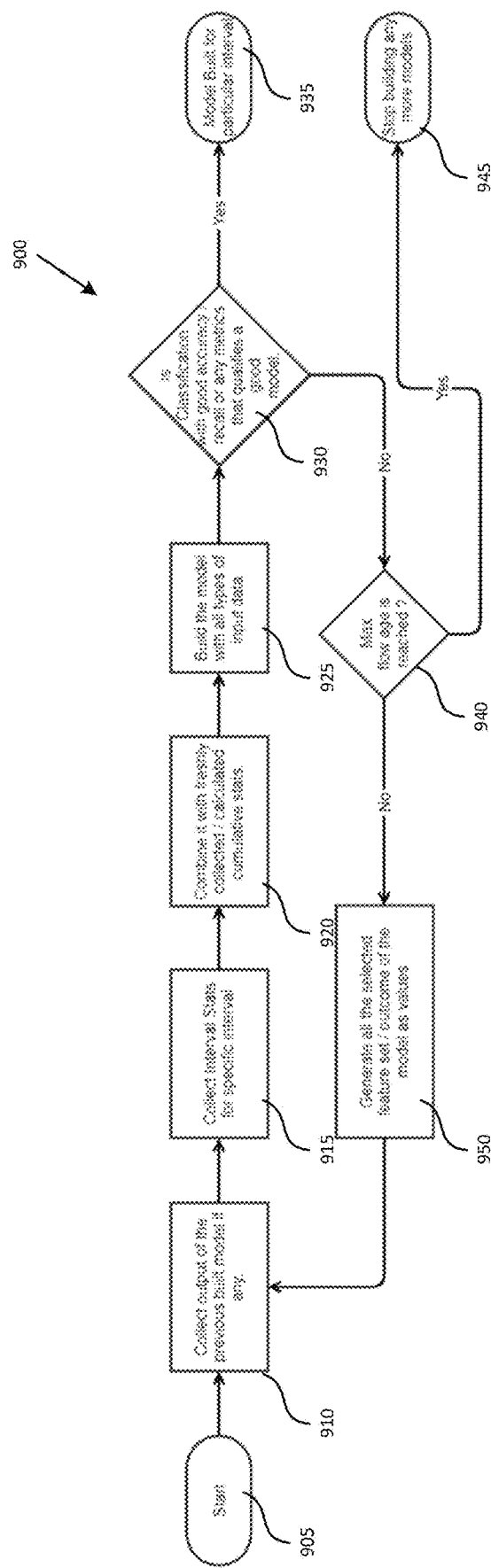
FIG. 11 illustrates a flow chart of a method for building a classification model according to an embodiment.

FIG. 11 illustrates a method 900 for building a next time slice model according to an embodiment. At 905, the model making module will begin to make a model. At 910, the model making module may collect the output of the previously built model. At 915, the statistics from the current time slice or time interval are collected. At 920, the statics are combined to determine cumulative statistics for a traffic flow. At 925, a model is built using the various types of input data including the previously and currently collected statistics and the output of any previous model.

At 930, the model making module determines whether the classification for the model being built is of sufficiently good quality. It will be understood that the accuracy of the model may be reviewed, and a level of accuracy may be obtained in order for the model to be considered sufficiently good. At 935, if the model has an accuracy above a predetermined threshold, the model will be used for the particular time interval. If the accuracy is not above the predetermined threshold in that the accuracy is not sufficiently high it will be determined if the maximum flow age has been reached, at 940. If the maximum flow age has been reached, nor further models will be built, at 945.

If the maximum flow age has not been reached, the data generated from the models is connected and passed on to next model, at 950. It is intended that the model of a previous stage is built prior to the model of a later stage so that the model can include input from the previous stage models.

It is intended that a model for a particular time interval is to be used by the system and method only for the corresponding time interval. Each model, either as a single model per time period or as part of a set of models per time period is intended to provide a classification of a traffic flow. If the model provides a full classification of the traffic flow for the particular aspect of the flow, for example, category of traffic, application of traffic, user device, or the like, no further evaluation may be needed. If there is only a partial or no classification after the data has been reviewed by the model, a further time slice and classification cycle may be used.

In a specific example, a traffic categorization model may output the category of a traffic flow as either Video Streaming or a Data Transfer traffic flow, after a first time interval. Which may eliminate the remainder of the traffic based on the traffic patterns and collected statistics. At the next time interval, the next interval model may classify the traffic flow as video streaming and the system may be able to initiate any traffic action on the traffic flow based on this categorization.

In another specific example, embodiments of the system and method may be configured for device type classification. In an initial time slice, a model may identify the device as an Apple device. In the next time slice, it may be classified to a particular device type, for example an iPhone, an iPad, or the like.

Embodiments of the system and method may define a partial match of the classification based on the confidence level of the match. If the match is below a confidence level threshold, a further iteration of classification, via for example a further time slice and collection of data may be done. If on the next iteration, the classification is above the confidence level threshold, the classification may be considered a full classification.

Embodiments of the system and method are intended to predict the classification of the flow earlier, and in some cases, as early as the first time interval. Predicting earlier is intended to allow use of the classification for traffic management actions as well as analytics of the network.

It is also intended that the embodiments of the system and method provide for partial prediction of the classification at an earlier stage in the flow. Providing partial prediction may allow an operator to take certain steps with respect to a flow or provide possible options of traffic management actions. For example, if it is known that the traffic flow is either video streaming or data transfer traffic flow, but it is not exhibiting aspects of VoIP, early decisions can be made to not implement any VoIP traffic actions for the flow.

Embodiments of the system and method are also intended to reduce CPU utilization and memory utilization of the network device associated with the system. In particular, by providing classifications at early intervals, the system may not store data from a full 15 seconds of the flow. Further, the traffic statistics are intended to be determined and reviewed in time slices, thus providing less CPU utilization for classifying the traffic. Calculating network statistics for a particular flow over a span of time is a CPU intensive task. The system and method detailed herein are intended to save CPU processing based on early and time sliced predictions.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for classifying a traffic flow in a computer network comprising:
    building a machine learning model to classify traffic flow;
    determining a plurality of time slices to be used to classify the traffic flow;
    collecting traffic flow statistics for a first time slice of the plurality of time slices, wherein traffic flow statistics comprise minimum, maximum, mean and standard deviation on network data, wherein the network data comprises bytes received, bytes sent, burst rate, burst duration, bitrate active time, idle time, and/or idle bitrate;
    classifying the traffic flow as an application or application type using the model and based on the statistics of the first time slice currently associated with the traffic flow;
        if the traffic flow is not classified after the first time slice, at each time slice interval of the plurality of time slices, collecting the traffic flow statistics for a further time slice and classifying the traffic flow based on the collected statistics for the further time slice and any previous partial classification using the model, otherwise, determining the flow as unclassified; and
    performing a traffic action on the classified flow.

2. The method of claim 1 wherein each classification model is based on traffic flow data and the classification results of at least one previous time slice.

3. The method of claim 1 further comprising:
    determining whether the traffic flow has reached a maximum flow age;
    if the maximum flow age has been reached, determining the flow is unclassified.

4. The method of claim 1 wherein each time slice is between 1 and 5 seconds.

5. The method of claim 1 wherein each time slice is between 1 and 3 seconds.

6. The method of claim 1 wherein the data collected for each further time slice comprises cumulative statistics for the traffic flow.

7. The method of claim 1 further comprising:
    determining the accuracy of each of the classification models for each time slice;
    determining whether the accuracy is at an acceptable threshold level; and
    if the accuracy is below an acceptable threshold level, updating the classification model.

8. A system for classifying a traffic flow in a computer network comprising at least one processor configured to execute instructions stored in a memory component wherein the instructions provide for modules comprising:
    a model making module configured to build a classification model to classify traffic flows in the computer network;
    a time interval module configured to determine a plurality of time slices to be used to classify a traffic flow;
    a data collection module configured to collect traffic flow statistics for a first of the plurality of time slices, wherein traffic flow statistics comprise minimum, maximum, mean and standard deviation on network data, wherein the network data comprises bytes received, bytes sent, burst rate, burst duration, bitrate, active time, idle time, and/or idle bitrate;
    a classification module configured to classify using the model and based on the statistics of the first time slice currently associated with the traffic flow, and classify the traffic flow as an application or application type if the traffic flow is not classified after the first time slice, at each time slice interval of the plurality of time slices, collecting the traffic flow statistics for a further time slice and classify the traffic flow based on the collected statistics for the further time slice and any previous partial classification using the mode, otherwise, determine the flow as unclassified; and
    a packet processing engine configured to perform traffic action on the classified flow.

9. The method of claim 1 wherein each time slice of the plurality of times slices is a different period of time.

10. The system of claim 8 wherein the model making module is configured to build each classification model based on traffic flow data and the classification results of at least one previous time slice.

11. The system of claim 8 wherein the classification module is further configured to:
    determine whether the traffic flow has reached a maximum flow age;
    if the maximum flow age has been reached, determine the flow is unclassified.

12. The system of claim 8 wherein the time interval module configures each time slice to between 1 and 5 seconds.

13. The system of claim 8 wherein the time interval module configures each time slice to between 1 and 3 seconds.

14. The system of claim 8 wherein the data collection module is configured to provide data collected for each further time slice comprises cumulative statistics for the traffic flow.

15. The system of claim 8 wherein the model making module is further configured to:
    determine the accuracy of each of the classification models for each time slice;
    determine whether the accuracy is at an acceptable threshold level; and
    if the accuracy is below an acceptable threshold level, update the classification model.

16. The system of claim 8 wherein each time slice of the plurality of times slices is a different period of time.

* * * * *